W. R. WEBSTER.
SAFETY STARTING MEANS FOR EXPLOSIVE ENGINES.
APPLICATION FILED JAN. 10, 1911.
1,044,315.
Patented Nov. 12, 1912.
2 SHEETS—SHEET 2.
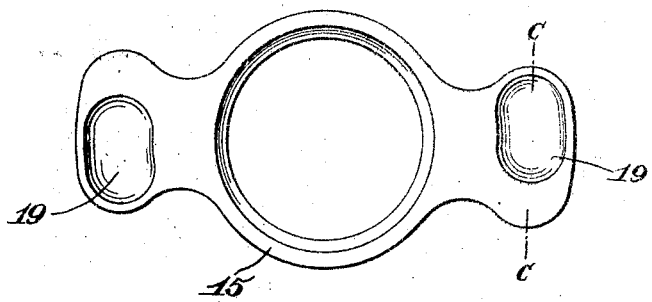
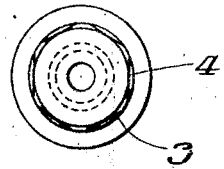
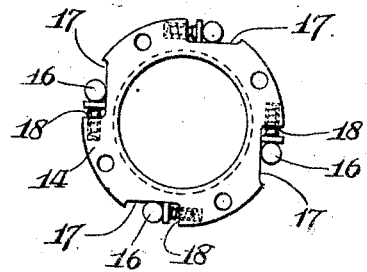
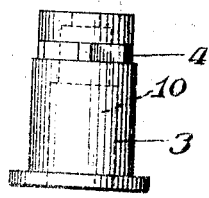
WITNESSES
INVENTOR
William R. Webster
BY Chas. A. Rutter
ATTORNEY

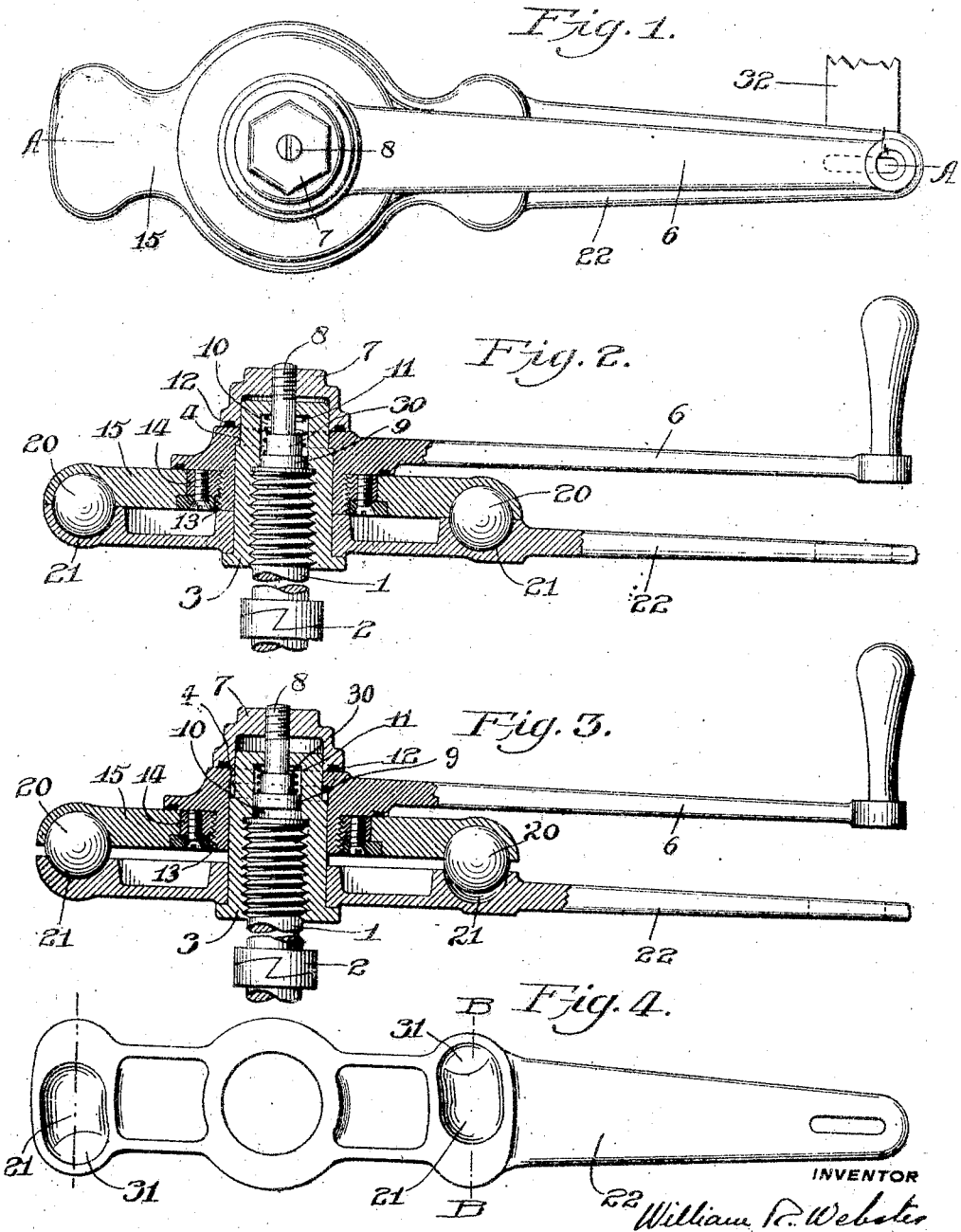

UNITED STATES PATENT OFFICE.

WILLIAM R. WEBSTER, OF PHILADELPHIA, PENNSYLVANIA.

SAFETY STARTING MEANS FOR EXPLOSIVE-ENGINES.

1,044,315.

Specification of Letters Patent.

Patented Nov. 12, 1912.

Application filed January 10, 1911. Serial No. 601,849.

*To all whom it may concern:*

Be it known that I, WILLIAM R. WEBSTER, a citizen of the United States, and a resident of the city and county of Philadelphia, State of Pennsylvania, have invented certain new and useful Improvements in Safety Starting Means for Explosive-Engines, of which the following is a specification.

My invention relates to improvements in starting means for explosive engines and the object of my invention is to furnish an improvement in means for preventing a rotation of the starting crank or handle of an internal combustion engine in the event of said engine starting in a reverse direction.

In the accompanying drawings forming part of this specification, and in which similar letters of reference indicate similar parts throughout the several views:—Figure 1, is a front elevation of my safety cranking device; Fig. 2, a section of Fig. 1 on line A—A the device being in its normal, or closed, position; Fig. 3, a view similar to Fig. 2 showing the device open, the position that it assumes instantly should the engine back-kick, or start in a reverse direction; Fig. 4, a plan of the non-rotating arm of the device; Fig. 5, a section through Fig. 4 on line B—B; Fig. 6, a side elevation and Fig. 7 a plan of the hub upon which the working parts of my device are carried; Fig. 8, a side elevation of clutch for locking the movable member, or cam piece, of the disengaging cams to the starting handle upon a reverse movement of the latter; Fig. 9, a plan of the cam piece; Fig. 10, a section of Fig. 9 on line C—C.

1 is the starting crank shaft of an explosive engine which is furnished with the usual clutch part 2 for engagement with the clutch part upon the engine shaft.

3 is a hub screwed or otherwise secured to the outer end of shaft 1. The main body of this hub, as well as its outer end are cylindrical in form, but separating these two cylindrical parts is an angular part, 4, Figs. 2, 3 and 6, preferably hexagonal in form, which is adapted to be engaged by a similarly formed hole 5 in the hub of the starting handle 6.

7 is a cap passing down over the outer cylindrical end of hub 3.

8 a stud the outer end of which is threaded and screwed into cap 7, the inner end of which carries a collar 9, which is furnished with a shoulder 30 to limit its outward movement. The inner end of stud 8 rests in a chamber 10 formed in hub 3 and a spring 11 bearing against the outer end of chamber 10 and the collar 9 on the stud forces this stud inward and draws the cap 8 against the hub of the starting handle 6.

12 is a washer, of felt preferably, upon the inner side of cap 7 to make a dust tight joint between this cap and the hub of starting handle.

The hub of the starting handle is furnished with an exteriorly threaded flange 13 which is screwed into a circular plate 14 which is placed within the cam-piece 15, Figs. 2, 3, 9 and 10. The plate 14 carries a locking device by means of which this plate is locked to the cam-piece 15 upon a reverse movement of the engine shaft but is free therefrom upon a forward movement.

In Fig. 8 the locking device is shown, consisting of a number of rollers 16 resting upon tangential seats 17 formed in notches cut in the periphery of plate 14. Upon a forward movement of the shaft 3 these rollers are driven back toward the heels 18 of the notches and permit the plate 14 to turn within the cam-piece 15 but upon a reverse movement of the shaft the rollers run out on the seats 17 and lock the plate 14 to the cam-piece 15. This locking device is so well known that detailed description of it will be unnecessary. Any of the other well known locking devices for accomplishing my purpose may be used. The outer ends of the cam piece 15 carry pockets 19 which are deeper at one end than at the other as shown in the section Fig. 10, and these pockets are adapted to hold one side of balls 20 the other side of which rest in pockets 21, carried in the arm 22, which is carried loosely by hub 3 and the outer end of which is adapted to be held in any convenient manner, by a strap 32, for instance, against rotation but not against a longitudinal movement with the shaft. Upon a forward movement of the starting crank 6 this crank through its connection with the angular part of the hub 3 rotates this hub and the parts directly secured to it, the cam 15 remaining in its normal position, through the balls 20 engaging the abrupt rear ends of their pockets. If for any reason the engine should not start properly upon a forward movement of the starting crank but should start in a reverse direction, the starting crank shaft and hub 3 would be reversed and the locking devices connecting the starting crank shaft and the cam-piece 15 would be thrown into action and the cam-piece 15 would turn in a reverse direction with the starting crank shaft. As the cam-piece starts to move it is by the balls 20 and the inclined pockets in which they are carried, or other cam connection between it and the arm 22, moved away from arm 22 taking with it the starting handle 6. As the starting handle moves outward its hub moves up the angular part 4 of the hub 3 and presently leaves this angular part and rests against the outer cylindrical part of the hub 3. The starting handle and the hub 3 are now out of operative connection and the hub 3 may continue to rotate in a reverse direction without turning the starting handle. In this position some sort of a lock to prevent a premature return of the cam-piece 15 to its first, or closed position would preferably be employed, for instance the balls 20 could drop into depressions 31 formed in the outer end of their seats as shown in Figs. 5 and 10. As soon as the starting handle is out of operative connection with the hub 3 it comes to rest as does the cam-piece 15 which is connected to this handle through any suitable locking means as described.

When starting the engine the clutch coupling shaft 1 and the engine shaft are in engagement. If now a back-kick occurs shaft 1 will be turned in a reverse direction and the locking device carried by disk 14, which is fast to shaft 1, will lock this disk to cam-piece 15 which will be turned backward with the shaft and this cam-piece will ride up on the cam connection between it and stationary lever 22. This movement will be communicated through collar 23 and pin 24 to shaft 1 which will be moved out sufficiently to uncouple clutch 2 after which the spring 29 will move the whole device sufficiently forward to prevent an engagement of the clutch 2 until the parts are purposely pushed into engagement.

It will be noted that the preferred form of the device herein described operates within itself and does not depend upon uncoupling the clutches connecting the starting crank and engine shafts as do most safety starting devices for explosive engines hence no particular form of clutch for coupling these parts is required.

The device being entirely selfcontained lends itself particularly for use in connection with automobile engines as it can be placed upon a starting crank shaft without it being necessary to make any change in the form of bracket carrying this shaft or in any other of the engine parts.

Having thus described my invention I claim as new and desire to secure by Letters Patent:—

1. In a starting means for explosive engines, in combination, a longitudinally movable starting crank shaft, a starting crank detachably secured to said shaft, a non-rotatable arm carried loosely in relation to said shaft but moving longitudinally therewith, a loose cam-piece, cams carried by said cam-piece and non-rotatable arm, and a means, non-operative upon a forward movement of said starting crank, for locking said cam-piece to the starting crank shaft upon a reverse movement of the latter in order to cause said cams to move said cam-piece away from said non-rotatable arm to operatively detach said starting crank from its shaft.

2. In a starting means for explosive engines, in combination, a longitudinally movable starting crank shaft, a hub secured to said shaft an outer portion of which is angular and the inner portion of which is circular in section, a starting crank adapted to be detachably carried by the angular portion of said hub, a non-rotatable arm carried loosely on the circular part of said hub and moving longitudinally therewith, a loose cam-piece between said non-rotatable arm and starting handle, cams carried by said cam-piece and non-rotatable arm, and a means, non-operative upon a forward movement of said starting crank, for locking said cam piece to the hub carried by the starting crank shaft upon a reverse movement of the latter in order to cause said cams to move said cam-piece outward to operatively detach said starting crank from said hub.

3. In a starting means for explosive engines, in combination, a longitudinally movable starting crank shaft, a hub, the inner part of which is cylindrical and the outer part of which is angular, carried by said shaft, a chamber at the outer end of said hub, a non-rotatable arm carried by the cylindrical part of said hub and longitudinally movable therewith, a starting crank carried loosely on the angular part of said hub, a cap surrounding said hub and resting upon said starting crank, a shouldered stud carried in the chamber in said hub and secured to said cap, a spring for normally forcing said stud inward, a loose cam-piece, cams carried by and connecting said cam-piece and non-rotatable arm, and a means for locking said cam-piece to said starting crank shaft upon a reverse movement of the latter.

WM. R. WEBSTER.

Witnesses:
F. L. MOISTER,
CHARLES A. RUTTER.